US010776280B1

(12) United States Patent
Yang et al.

(10) Patent No.: US 10,776,280 B1
(45) Date of Patent: Sep. 15, 2020

(54) DATA STORAGE DEVICE AND METHOD FOR UPDATING LOGICAL-TO-PHYSICAL MAPPING TABLE

(71) Applicant: Silicon Motion, Inc., Jhubei, Hsinchu County (TW)

(72) Inventors: Chen-Ning Yang, Kaohsiung (TW); Chien-Chung Chung, Taipei (TW); Jian-Wei Sun, Taipei (TW)

(73) Assignee: SILICON MOTION, INC., Hsinchu County (TW)

( * ) Notice: Subject to any disclaimer, the term of this patent is extended or adjusted under 35 U.S.C. 154(b) by 4 days.

(21) Appl. No.: 16/429,415

(22) Filed: Jun. 3, 2019

(30) Foreign Application Priority Data

Apr. 10, 2019 (TW) .............................. 108112529 A

(51) Int. Cl.
*G06F 12/1027* (2016.01)
*G06F 12/1009* (2016.01)
*G06F 3/06* (2006.01)

(52) U.S. Cl.
CPC ........ *G06F 12/1009* (2013.01); *G06F 3/0604* (2013.01); *G06F 3/0659* (2013.01); *G06F 3/0673* (2013.01); *G06F 12/1027* (2013.01); *G06F 2212/1044* (2013.01)

(58) Field of Classification Search
None
See application file for complete search history.

(56) References Cited

U.S. PATENT DOCUMENTS

| 10,013,187 B2 * | 7/2018 | Yeh ........................ G06F 3/0655 |
| 2008/0071971 A1 * | 3/2008 | Kim ..................... G06F 12/0246 |
| | | 711/103 |

\* cited by examiner

*Primary Examiner* — Brian R Peugh
(74) *Attorney, Agent, or Firm* — McClure, Qualey & Rodack, LLP

(57) ABSTRACT

A data storage device is provided. The data storage includes: a flash memory, a dynamic random access memory (DRAM), and a memory controller. The flash memory stores a logical-to-physical mapping (L2P) table that is divided into a plurality of group-mapping (G2P) tables, and includes a first logical unit number (LUN) and a second LUN that are respectively controlled by a first chip enable (CE) signal and a second CE signal. The memory controller receives a write command from a host, and forms super page data using logical pages of data in the write command. The memory controller reads one of the group-mapping tables from the first LUN or the second LUN to the DRAM after sequentially enabling the first CE signal and second CE signal to write a first portion and a second portion of the super page data to the first LUN and the second LUN.

12 Claims, 10 Drawing Sheets

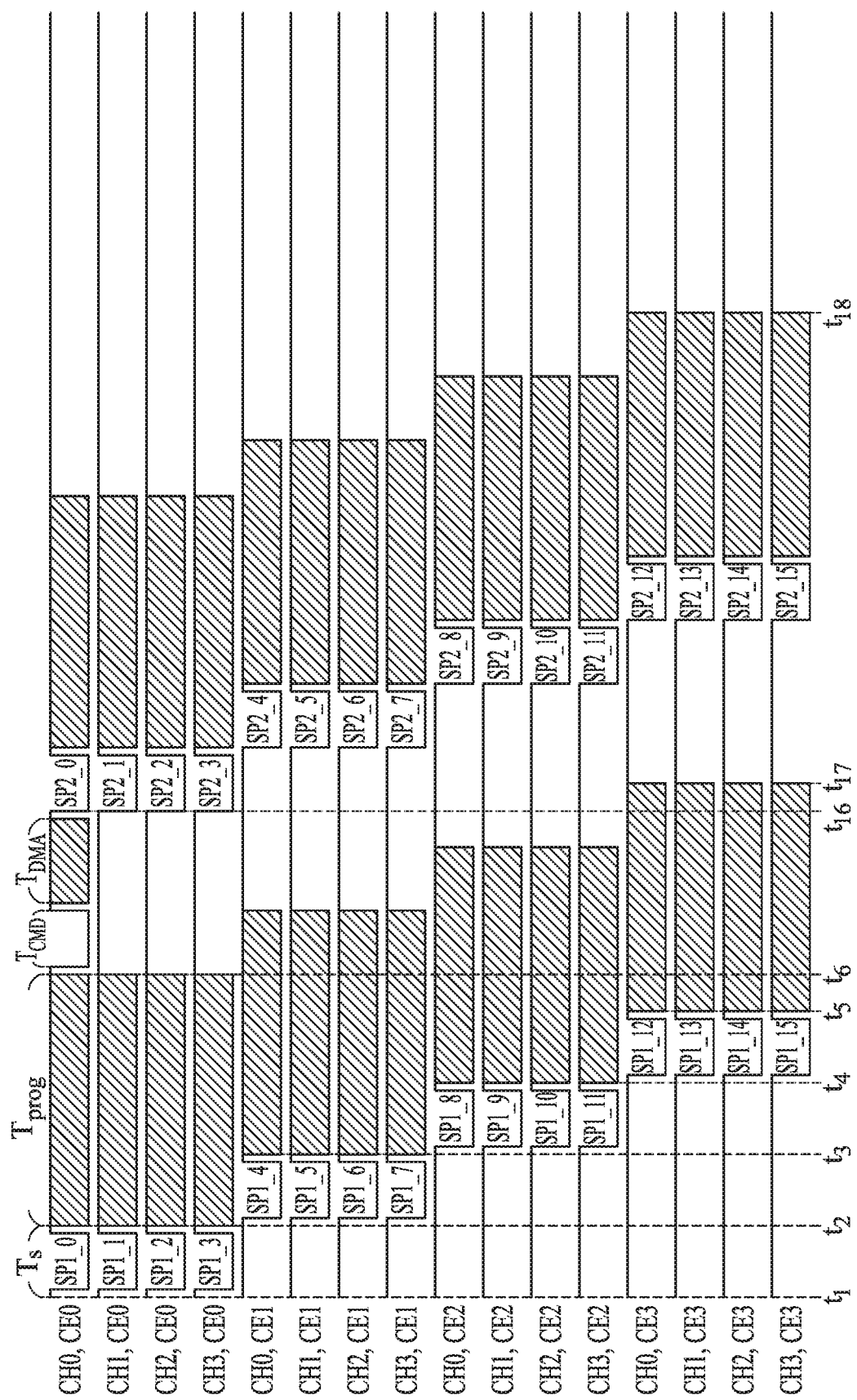

DATA STORAGE DEVICE AND METHOD FOR UPDATING LOGICAL-TO-PHYSICAL MAPPING TABLE

CROSS REFERENCE TO RELATED APPLICATIONS

This Application claims priority of Taiwan Patent Application No. 108112529, filed on Apr. 10, 2019, the entirety of which is incorporated by reference herein.

BACKGROUND OF THE INVENTION

Field of the Invention

The present invention relates to data storage devices and, in particular, to a data storage device and a method for updating a logical-to-physical mapping table.

Description of the Related Art

Flash memory devices typically include NOR flash devices and NAND flash devices. NOR flash devices are random access—a host accessing a NOR flash device can provide the device with any address on its address pins and immediately retrieve data stored in that address on the device's data pins. NAND flash devices, on the other hand, are not random access but serial access. It is not possible for NAND flash devices to access any random address in the same way as the NOR flash devices. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads complete pages from the memory cells and writes complete pages to the memory cells. After a page of data is read from the array into a buffer inside the device, the host can access the data bytes or words one by one by serially clocking them out using a strobe signal.

However, as the capacity of the NAND flash memory increases, if the dynamic random access memory (DRAM) on the controller side completely records the entire logical-to-physical mapping table of the NAND flash memory, the capacity requirement of the DRAM is also quite large, resulting in higher costs. If a DRAM having a smaller capacity is used, it is necessary to dynamically replace the group-mapping table in the DRAM. The conventional replacement mechanism may replace the newly read group-mapping table with the group-mapping table that has not been written into the flash memory. In addition to causing the mapping relationship error, the controller also needs to read the corresponding group-mapping table from the flash memory again, resulting in loss of performance.

Accordingly, there is a demand for a data storage device and a method for updating the logical-to-physical mapping table thereof to solve the aforementioned problem.

BRIEF SUMMARY OF THE INVENTION

In an exemplary embodiment, a data storage device is provided. The data storage includes: a flash memory, a dynamic random access memory (DRAM), and a memory controller. The flash memory is configured to store a logical-to-physical mapping (L2P) table, wherein the L2P table is divided into a plurality of group-mapping tables, and the flash memory comprises a first logical unit number (LUN) and a second LUN that are respectively controlled by a first chip enable signal and a second chip enable signal. The DRAM is configured to store a first set of the group-mapping tables. The memory controller is configured to receive a write command from a host, and form super page data using a plurality of logical pages of data in the write command. The memory controller is further configured to sequentially enable the first chip enable signal and the second chip enable signal to write a first portion and a second portion of the super page data to the first LUN and the second LUN. In response to the super page data having been written into the first LUN and the second LUN, the memory controller reads at least one of the group-mapping tables from the first LUN or the second LUN to the DRAM.

In some embodiments, when the first chip enable signal is enabled to write the first portion of the super page data in the first LUN and a first read command corresponding to the at least one group-mapping table has been stored in a command queue, the memory controller enables the second chip enable signal to write the second portion of the super page data to the second LUN after the first LUN has entered a programming phase; and in response to the super page data having been written into the first LUN and the second LUN, the memory controller executes the first read command to read the at least one group-mapping table from the first LUN or the second LUN to the DRAM.

In some embodiments, when the first chip enable signal is enabled to write the first portion of the super page data into the first LUN and the first read command corresponding to the at least one group-mapping has been stored in the command queue: in response to the at least one group-mapping table being in the first LUN, the memory controller executes the first read command to read the at least one group-mapping table from the first LUN to the DRAM after the programming phase of the first LUN has finished; and in response to the at least one group-mapping table being in the second LUN, the memory controller executes the first read command to read the at least one group-mapping table from the second LUN to the DRAM after the programming phases of the first LUN and the second LUN have finished.

In some embodiments, after the memory controller has executed the first read command to read at least one group-mapping table from the first LUN or the second LUN to the DRAM, the memory controller is further configured to update the at least one group-mapping table according to a plurality of logical addresses corresponding to the logical pages of data of the write command and a plurality of physical addresses that are used to write the logical pages of data into the first LUN and the second LUN.

In some embodiments, after the memory controller has updated the at least one group-mapping table, in response to a predetermined condition being satisfied, the memory controller writes the updated group-mapping tables stored in the DRAM in the flash memory, wherein the predetermined condition indicates that a number of the updated group-mapping tables in the DRAM has reached a predetermined number.

In another exemplary embodiment, a method for updating a logical-to-physical mapping (L2P) table, for use in a data storage device. The data storage device comprises a flash memory and a dynamic random access memory (DRAM). The flash memory is configured to store the L2P table, and the L2P table is divided into a plurality of group-mapping table. The flash memory comprises a first logical unit number (LUN) and a second LUN that are respectively controlled by a first chip enable signal and a second chip enable signal. The method includes the steps of: forming super page data using a plurality of logical pages of data of a write command from a host; sequentially enabling the first chip enable signal and the second chip enable signal to write a first portion and a second portion of the super page data to the first LUN and the second LUN; and in response to the super page data having been written into the first LUN and the second LUN, reading at least one of the group-mapping tables from the first LUN or the second LUN to the DRAM.

BRIEF DESCRIPTION OF THE DRAWINGS

The present invention can be more fully understood by reading the subsequent detailed description and examples with references made to the accompanying drawings, wherein:

FIGS. 5D and 5E are diagrams of the interleaving programming mechanism of the flash memory plus the read operation in accordance with another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
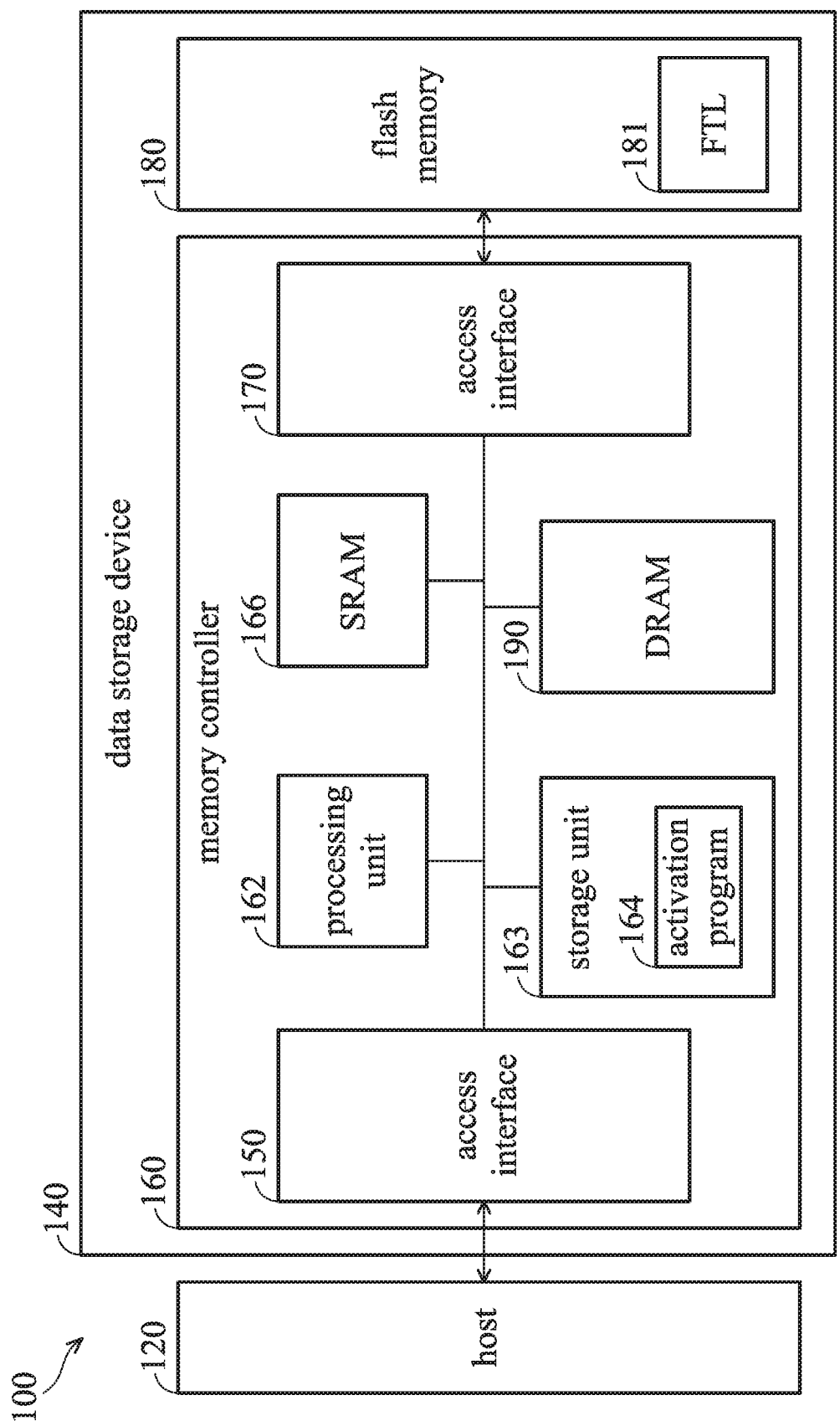
FIG. 1 is a block diagram of an electronic device in accordance with an embodiment of the invention.

FIG. 1 is a block diagram of an electronic device in accordance with an embodiment of the invention. The electronic device 100 may be a personal computer, a data server, a network-attached storage (NAS), a portable electronic device, etc., but the invention is not limited thereto. The portable electronic device may be a laptop, a hand-held cellular phone, a smartphone, a tablet PC, a personal digital assistant (PDA), a digital camera, a digital video camera, a portable multimedia player, a personal navigation device, a handheld game console, or an e-book, but the invention is not limited thereto.

The electronic device 100 includes a host 120 and a data storage device 140. The data storage device 140 includes a memory controller 160, a flash memory 180 and a dynamic random access memory (DRAM) 190. The controller 160 includes a processing unit 162, a storage unit 163, a static random-access memory (SRAM) 166. The processing unit 162 can be implemented in various manners, such as dedicated hardware circuits or general-purpose hardware (for example, a single processor, a multi-processor capable of performing parallel processing, or other processor with computation capability). For example, the processing unit 162 may be implemented by a general-purpose processor or a microcontroller, but the invention is not limited thereto. In some embodiments, the DRAM 190 can be substituted by a host memory buffer (not shown) in the host 120. The storage space of the DRAM 190 is larger than that of the SRAM 166.

The processing unit 162 in the controller 160 may control the flash memory 180 according to the command from the host 120, such as writing data to a designated address of the flash memory 180 or reading page data from a designated address from the flash memory 180.

In the electronic device 100, several electrical signals for coordinating commands and data transfer between the processing unit 162 and the flash memory 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc.

The access interface 170 may communicate with the flash memory 180 using a SDR (Single Data Rate) protocol or a DDR (Double Data Rate) protocol, such as ONFI (open NAND flash interface), DDR toggle, or others. The processing unit 162 may communicate with the host 120 through an access interface 150 using a designated communication protocol, such as USB (Universal Serial Bus), ATA (Advanced Technology Attachment), SATA (Serial ATA), PCI-E (Peripheral Component Interconnect Express), NVME (Non-volatile Memory Express), or others.

The storage unit 163 may be a non-volatile memory such as a read-only memory (ROM), an erasable programmable read-only memory (EPROM), an electrically erasable programmable read-only memory (EEPROM), or an e-fuse, but the invention is not limited thereto. The storage unit 163 may store an activation program 164. The activation program may include boot code or a boot loader that is executed by the processing unit 162, and the controller 160 may be booted up based on the activation program 164 to control operations of the flash memory 180, such as reading in-system programming code.

The flash memory 180, for example, may be a NAND flash memory and the flash memory may include a plurality of logic units, and each logic unit has a corresponding logical unit number (LUN), and each LUN communicates with the processing unit 162 using the corresponding access sub-interface. In some embodiments, each LUN may include one or more flash memory dies or planes, and each plane may include a plurality of physical blocks.

Figure 2:
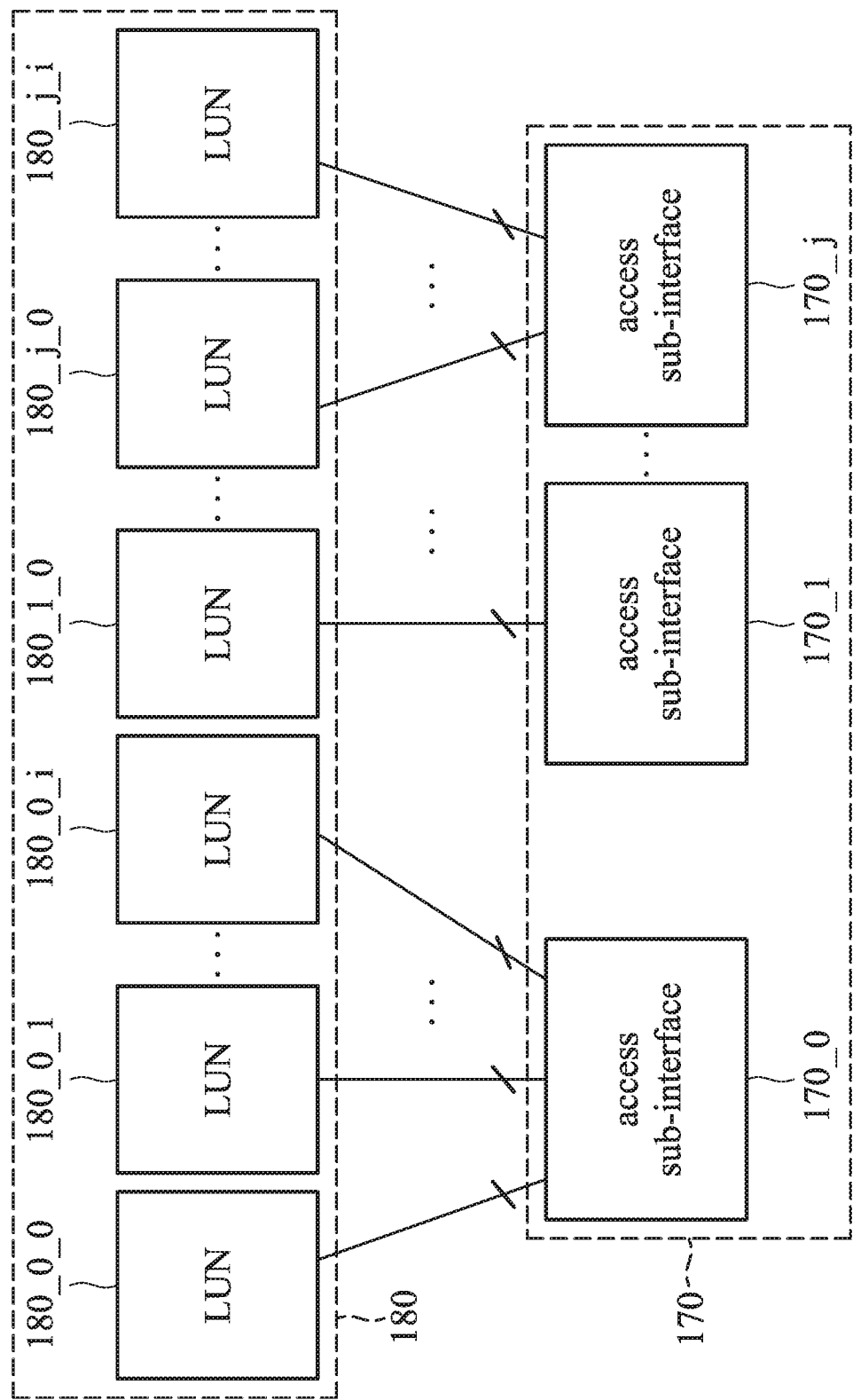
FIG. 2 is a schematic diagram illustrating interfaces to storage units of a flash storage in accordance with an embodiment of the invention.

FIG. 2 is a schematic diagram illustrating interfaces to storage units of a flash storage in accordance with an embodiment of the invention.

The data storage device 140 may contain j+1 access sub-interfaces 170_0 to 170_j, where the access sub-interfaces may be referred to as channels, and each access sub-interface connects to i+1 LUNs. That is, i+1 LUNs may share the same access sub-interface. For example, assume that the flash memory contains 4 channels (j=3) and each channel connects to 4 LUNs (i=3): The flash memory 10 has 16 LUNs 180_0_0 to 180_j_i in total. The processing unit 162 may direct one of the access sub-interfaces 170_0 to 170_j to read data from the designated LUN. Each LUN has an independent CE control signal.

Figure 3:
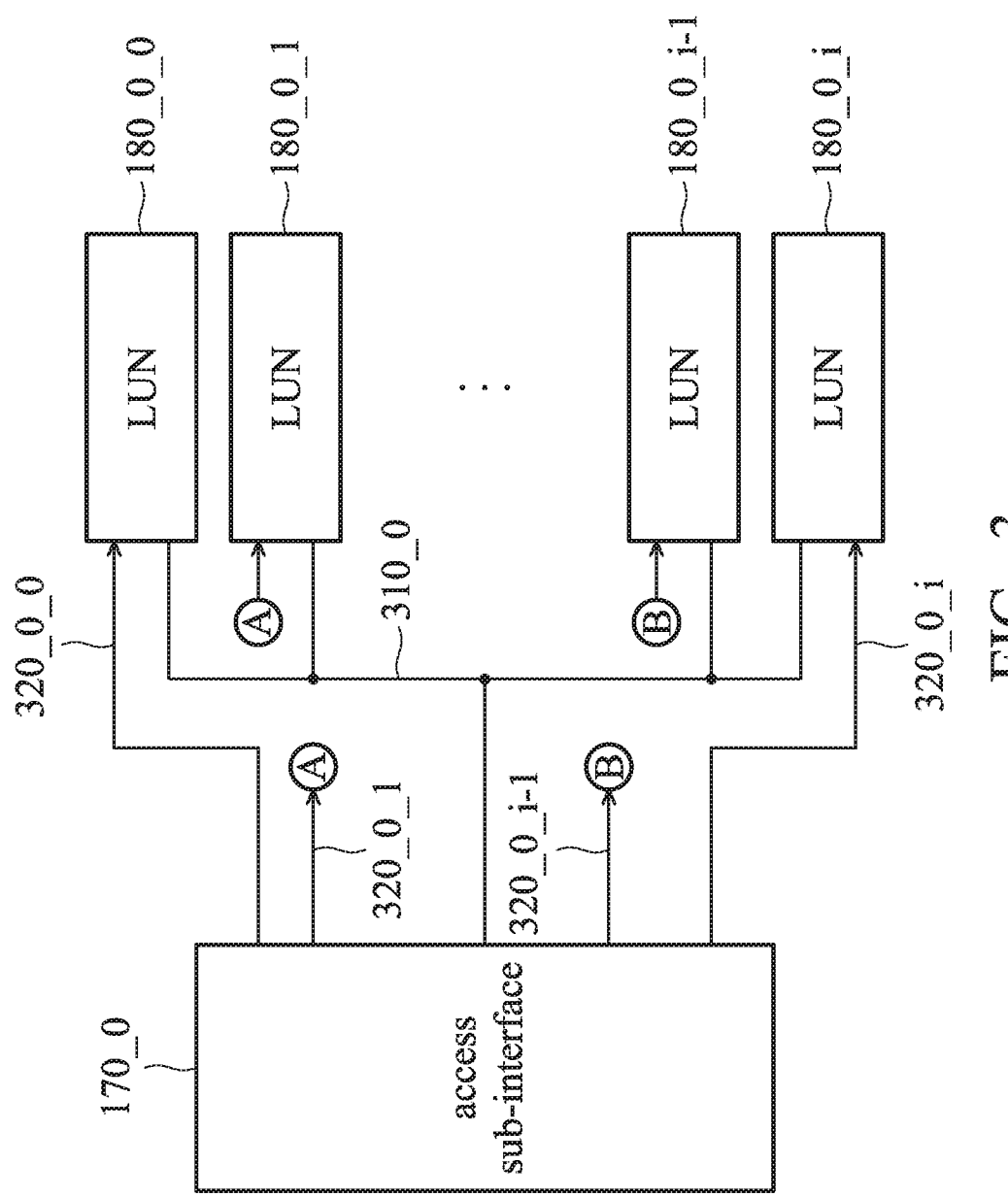
FIG. 3 is a schematic diagram depicting connections between one access sub-interface and multiple LUNs according to an embodiment of the invention.

That is, it is required to enable a corresponding CE control signal when attempting to perform data read from a designated LUN via an associated access sub-interface. FIG. 3 is a schematic diagram depicting connections between one access sub-interface and multiple LUNs according to an embodiment of the invention. The processing unit 162, through the access sub-interface 170_0, may use independent CE control signals 320_0_0 to 320_0_i to select one of the connected LUNs 180_0_0 and 180_0_i, and then read data from the designated location of the selected LUN via the shared data line 310_0.

The procedure of writing data into the flash memory 180 can be regarded as a "programming" operation. The programming operation of the flash memory 180 is performed in pages, and each physical can be written with a logical page. The erase operation of the flash memory 180 is performed in blocks. The size of a page, for example, may be 16K Bytes, and each page can be divided into four sectors, and the size of each sector may be 4K Bytes.

In an embodiment, in order to improve the performance of the data storage device 140, the memory controller 160 may form a super block using multiple physical blocks, and physical pages located in different physical blocks in the super block may form a super page (SP). The programming operation can be performed in super pages, and each physical super page can be written with a logical super page (i.e., a piece of super page data (SPD)). For example, if an one-way-four-channel architecture is used in the flash memory 180, i=0 and j=3 are set in the architecture of the flash memory 180 in FIG. 2, and each physical super page SP may include four physical pages. That is, each physical super page SP may store four logical pages. If a four-way-two-channel architecture is used in the flash memory 180, i=3 and j=1 are set in the architecture of the flash memory 180 in FIG. 2, and each physical super page SP may include eight physical pages. That is, each physical super page SP may store eight logical pages, and so on. For purposes of description, a four-way-four-channel architecture is used in the flash memory 180 in the following embodiments. That is, i=3 and j=3 are set in the architecture of the flash memory 180 in FIG. 2, but the invention is not limited thereto.

In an embodiment, the host 120 may control the data storage device 140 to read or write data in a size of 512 Bytes or 4K Bytes (i.e., user data) that is indexed using logical addresses for the logical pages or logical sectors in the access command. For example, the logical addresses may be logical block addresses (LBAs), global host pages (GHPs), host blocks, host pages, etc. While the data storage device 140 is operating, the memory controller 160 may build and update the logical-to-physical mapping (L2P) table, and the L2P table may be stored in the flash translation layer (FTL) 181 in the flash memory 180 of the data storage device 140. The L2P table may record the mapping information from the logical addresses to physical addresses, and the memory controller 160 may perform the access command from the host 120 according to the L2P table.

If the capacity of the DRAM 190 is limited or the data storage device 140 is not equipped with the DRAM 190 and uses the host memory buffer (HMB) instead, the entire L2P table cannot be completely loaded into the DRAM 190 or the HMB. In this situation, the memory controller 160 may load a set of L2P table into the DRAM 190 or the HMB.

Figure 4:
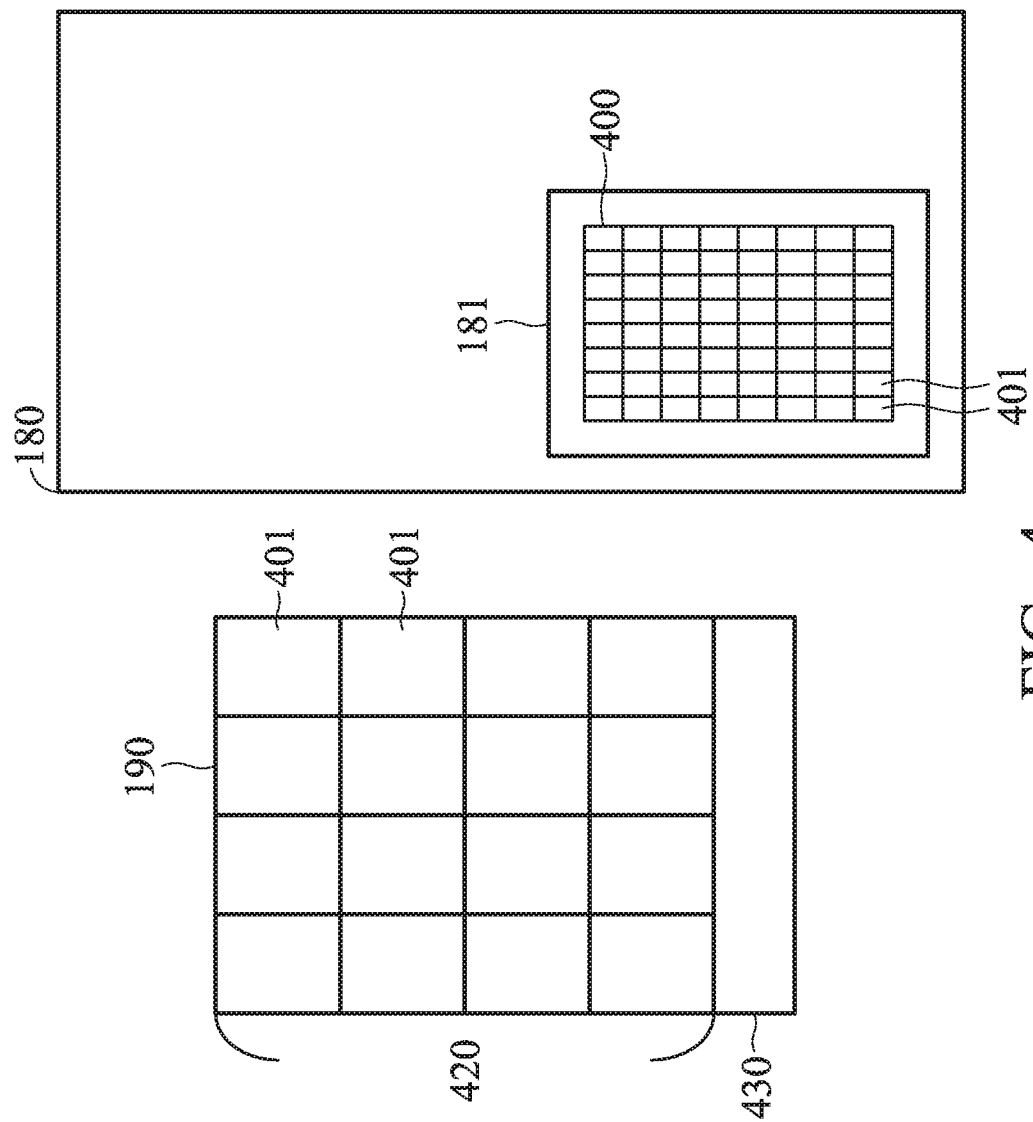
FIG. 4 is a diagram of the access information table and the logical-to-physical mapping table in accordance with an embodiment of the invention.

FIG. 4 is a diagram of the access information table and the logical-to-physical mapping table in accordance with an embodiment of the invention.

In an embodiment, the L2P table 400, for example, can be evenly divided into a plurality of group-mapping tables 401, such as 1024 group-mapping tables 401. The size of each group-mapping table 401 may be 4K bytes. Given that the size of each entry in each group-mapping table 401 is 4 bytes, each group-mapping table 401 may record 1024 pieces of mapping information. In order to facilitate management of group mapping tables, the size of each group mapping table is preferably equal to or smaller than the size of a physical page or a physical sector, which is consistent with the data management unit. It should be noted that the size of each group-mapping table 401 can be set according to the requirement of practical designs, and the invention is not limited thereto.

The memory controller 160, for example, may store a set of group-mapping table 401 in the L2P table 400 to the first predetermined space 420 in the DRAM 190, such as 16 group-mapping tables 401, as depicted in FIG. 4.

The memory controller 160 may receive one or more access commands from the host 120 to access the data stored in the flash memory 180, and each of the aforementioned access commands, for example, may be a write command, a read command, or a trim command. For example, the write command may include 64 pieces of data and 64 corresponding logical addresses (e.g., the start logical address plus 63 subsequent logical addresses), and the memory controller 160 may write the 64 pieces of data into one super page, and update the mapping relationship between each of the 64 logical addresses and its corresponding physical address in the L2P table.

In an embodiment, assuming that the access command received by the memory controller 160 from the host 120 is a write command, the memory controller 160 may first determine whether the group-mapping table 401 corresponding to each logical address in the access command has been stored in the DRAM 190. If the group-mapping table 401 corresponding to each logical address in the access command has been stored in the DRAM 190, the memory controller 160 may directly access or update the group mapping tables 401 in the DRAM 190. If the group-mapping tables corresponding to some or all of the logical addresses have not been stored in the DRAM 190, the memory controller 160 may read the corresponding mapping tables 401 from the flash memory 180 to the DRAM 190, such as using a predetermined replacement mechanism to replace one or more group-mapping tables 401 that are originally stored in the DRAM 190 with the newly read one or more group-mapping tables 401. For example, the aforementioned predetermined replacement mechanism may be implemented by a least recently used (LRU) algorithm, a least frequently used (LFU) algorithm, a first-in-first-out (FIFO) algorithm, a second chance algorithm, etc., but the invention is not limited thereto.

Figure 5A:
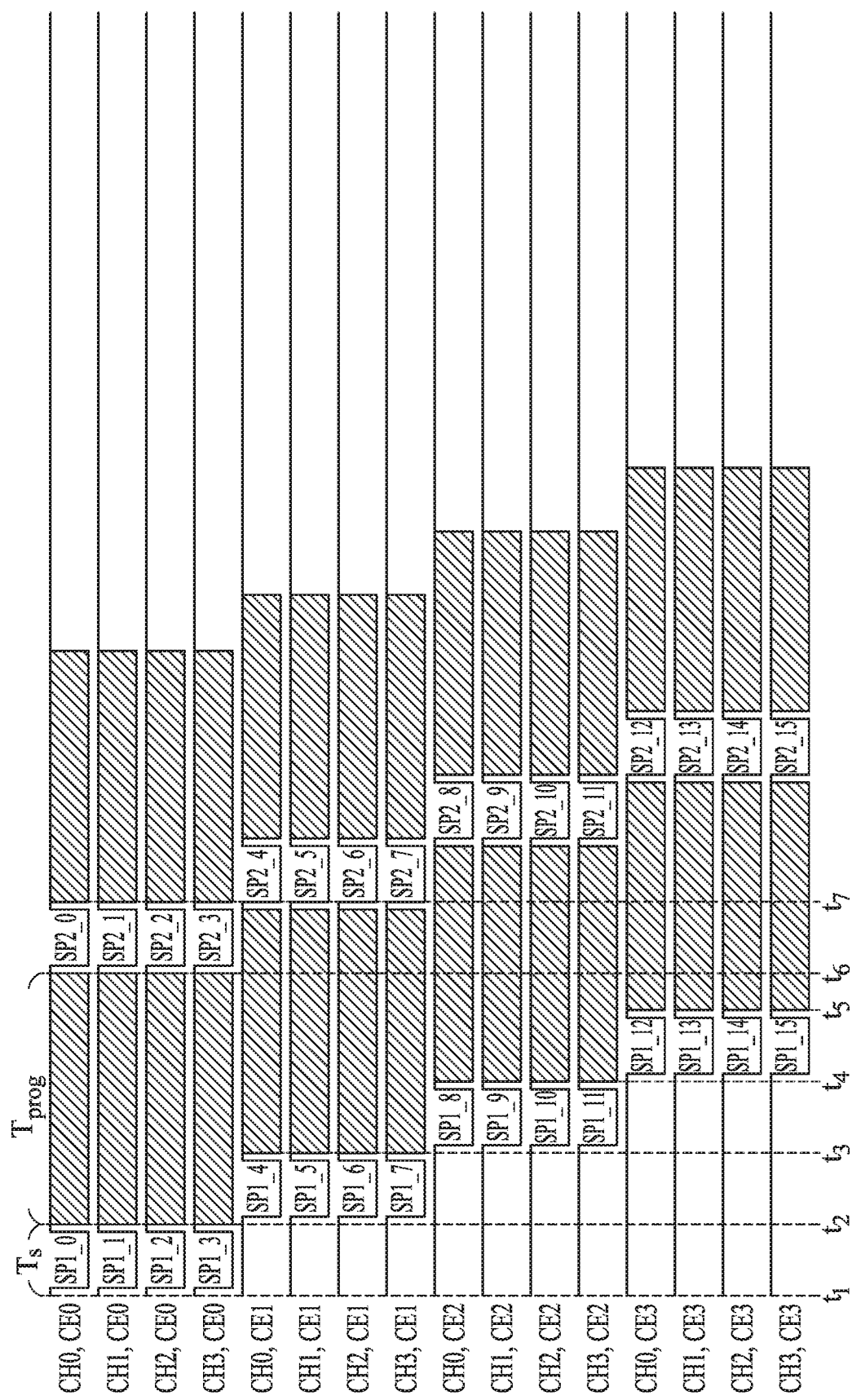
FIG. 5A is a diagram of the interleaving mechanism for writing the super page data in the flash memory in accordance with an embodiment of the invention.

FIG. 5A is a diagram of the interleaving mechanism for writing the super page data in the flash memory in accordance with an embodiment of the invention. The operation of writing data into the flash memory may include a setup phase and a programming phase. The interleaving programming mechanism is a way to accelerate the data programming of the flash memory, so that different blocks on the same channel can be placed in the setup phase e and the programming phase in turn, thereby saving the time required in the setup phase and programming phase. Taking the chip enable signal CE0 as an example, in the setup phase, the memory controller 160 may set the chip enable signal CE0 to a low-logic state (i.e., active low), and asserts control signals ALE, CLE, and WE of the flash memory 180 to select four blocks in the LUN on the channels CH0~CH3. Afterwards, the memory controller 160 may transmit each of the four logical pages in the super page data SP1 to a respective page buffer of each of the four blocks in the channels CH0~CH3. The time taken in the setup phase can be regarded as the setup time Ts. In the programming phase, the memory controller 160 may write the data stored in each page buffer into a designated physical page in the LUN, wherein the time taken in the programming phase can be regarded as the programming time Tprog. When the four blocks in the selected LUN are in the programming phase, the memory controller 160 may set the chip enable signal CE0 to the high-logic state and set the chip enable signal CE1 to the low-logic state, so that another four blocks in the channels CH0~CH3 may enter the setup phase. For example, the four blocks associated with the chip enable signal CE1 and the four blocks associated with the chip enable signal CE0 can be placed in different LUNs, and thus different blocks in the same channel can be operated in the setup phase and programming phase in turn.

In an embodiment, the memory controller 160 may control the LUN in the same channel using a single chip enable signal, and select one of the blocks in the LUN using the physical address, but the invention is not limited thereto.

When the memory controller 160 receives an access command (e.g., a write command) from the host 120, the memory controller 160 preferably manages the data of the access command in super pages. Since the four-way-four-channel architecture is used in the flash memory 180 in this embodiment, a logical super page may include 16 logical pages (i.e., 64 logical sectors) of data. The memory controller 160 may write 16 logical pages of data into 16 physical pages of the flash memory 180 in a batch or sequentially. For example, if the super page data SPD1 (i.e., a logical super page) is to be written into the flash memory 180, the memory controller 160 may first enable the chip enable signal CE0, and write four logical pages of data of the super page data SPD1 into four physical pages in different channels. The memory controller 160 may sequentially enable each of the chip enable signals CE1~CE2 in a similar manner as described above to write the remaining 12 logical pages of the super page data SPD1 into another twelve physical pages of the flash memory 180.

It should be noted that once the four LUNs controlled by the same chip enable signal CE have entered the programming phase, these LUNs will be in the busy state until the programming phase of these LUNs is over. In other words, these LUNs will leave the busy state and enter the ready state until the programming phase of these LUNs is over. At this time, the memory controller 160 can perform other operation on these LUNs, such as read or write operations.

For example, when the memory controller 160 is performing a first write command, the memory controller 160 may respectively set the chip enable signals CE0, CE1, CE2, and CE3 to the low-logic state to enter the setup phase, and write corresponding logical page data to the selected blocks in each of the channels CH0~CH3 at times t1, t2, t3, and t4. For example, at time t1, the memory controller 160 may transmit 4 logical pages of data SPD1_0~SPD1~3 in the super page data SPD1 to four blocks in the channels CH0~CH3. At time t2, the memory controller 160 may transmit 4 logical pages of data SPD1_4~SPD1_7 to another four blocks in the channels CH0~CH3. At time t3, the memory controller 160 may transmit 4 logical pages of data SPD1_8~SPD1_11 to yet another four blocks in the channels CH0~CH3. At time t4, the memory controller 160 may transmit 4 logical pages of data SPD1_12~SPD1_15 to yet another four blocks in the channels CH0~CH3, wherein the time interval between two neighboring times of the times t1, t2, t3, and t4 is the setup time Ts.

At time t5, the setup phase of the four blocks in the channels CH0~CH3 controlled by the chip enable signal CE3 is over, and the memory controller 160 may control these four blocks to enter the programming phase. Once the programming phase of these four blocks is completed (i.e., entering the ready state from the busy state), the writing operation of the super page data SPD1 is finished.

At time t6, since the programming phase of the four blocks in the channels CH0~CH3 controlled by the chip enable signal CE0 has completed (i.e., the programming time Tprog is between time t2 to t6), the memory controller 160 may start the write operation of the second super page data SPD2. For example, at time t6, the memory controller 160 may set the chip enable signal CE0 to the low-logic state, and asserts control signals ALE, CLE, and WE of the flash memory 180 to select four blocks in the channels CH0~CH3, and transmit four logical pages of data SPD2_0~SPD2_3 of the super page data SPD2 to these four blocks. Similar steps as described in the write operation of the super page data SPD1 can be repeated to complete the write operation of the super page data SPD2.

Since the space of the DRAM 190 in the data storage device 140 is capable of storing 16 group-mapping tables 401, the memory controller 160 may immediately update the content of the group-mapping tables 401 after writing logical pages of data into the physical pages of the flash memory 180 so as to ensure the correctness of the group-mapping tables 401. However, this may cause conflicts between the write operation and read operation. For example, the memory controller 160 may receive a write command from the host 120, such as a write command writing 64 logical sectors of data into the flash memory 180. While performing the write command, the memory controller 160 may form the super page data SPD1 using these 64 logical sectors of data, and sequentially write 16 logical pages of data of the super page data SPD1 into the flash memory 180 each time.

During the procedure of writing the super page data SPD1 into the flash memory 180, the mapping relationships between logical addresses and physical addresses may also be changed. Accordingly, the memory controller 160 needs to update the content in one or more group-mapping tables 401, and write the updated group-mapping tables 401 into the flash memory 180. If the group-mapping table 401 that is needed to be updated is not stored in the DRAM 190, the memory controller 160 has to load the group-mapping table 401 that is need to be updated from the flash memory 180 to the DRAM 190. If more group-mapping tables that are need to be updated are not stored in the DRAM 190, the memory controller 160 has to consume more time to read these group-mapping tables 401 from the flash memory 180. Similarly, the memory controller 160 also has to consume more time to write the updated group-mapping tables 401 into the flash memory 180.

Figure 5B:
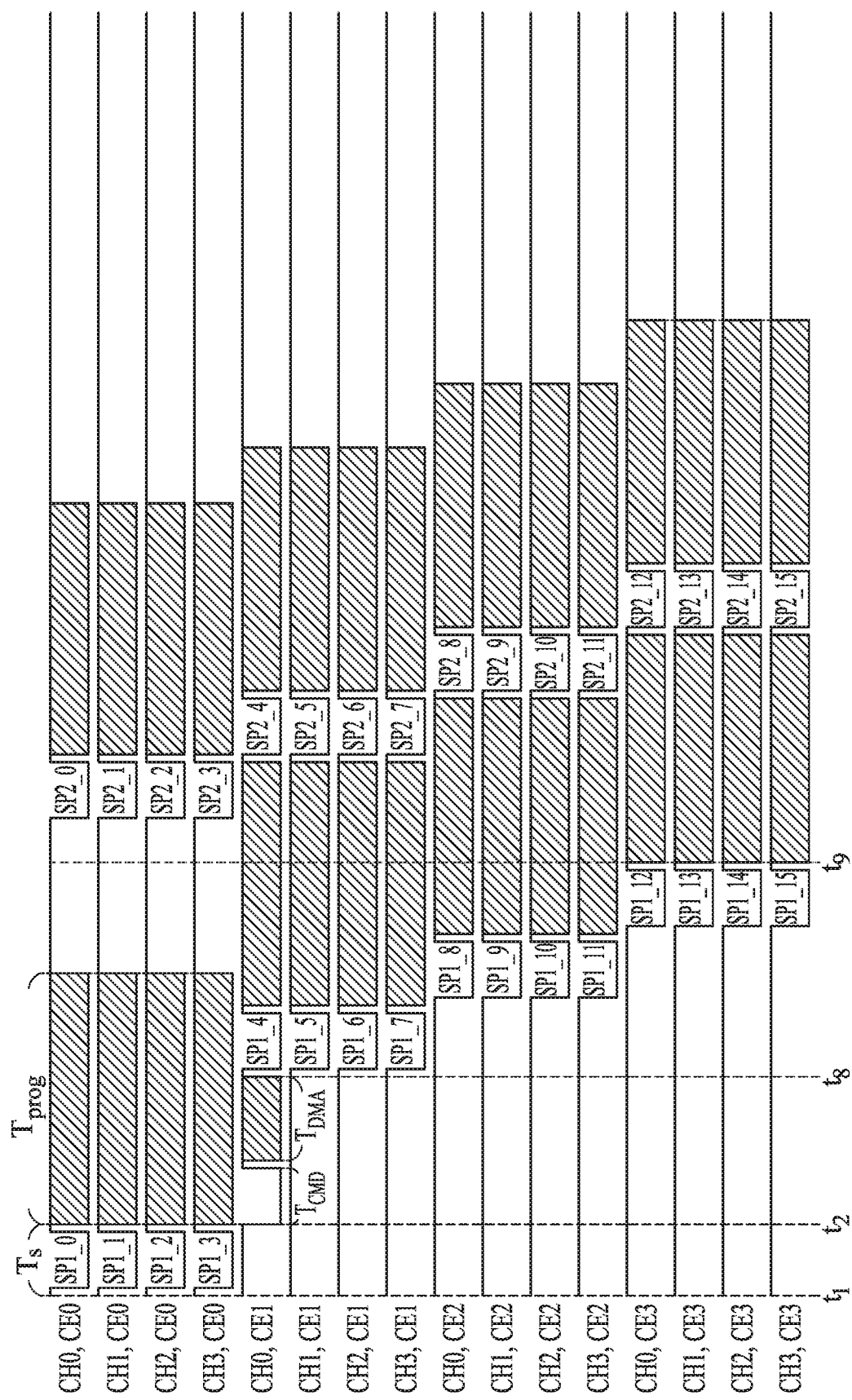
FIGS. 5B and 5C are diagrams of the interleaving programming mechanism of the flash memory plus the read operation in accordance with an embodiment of the invention.
Figure 5C:
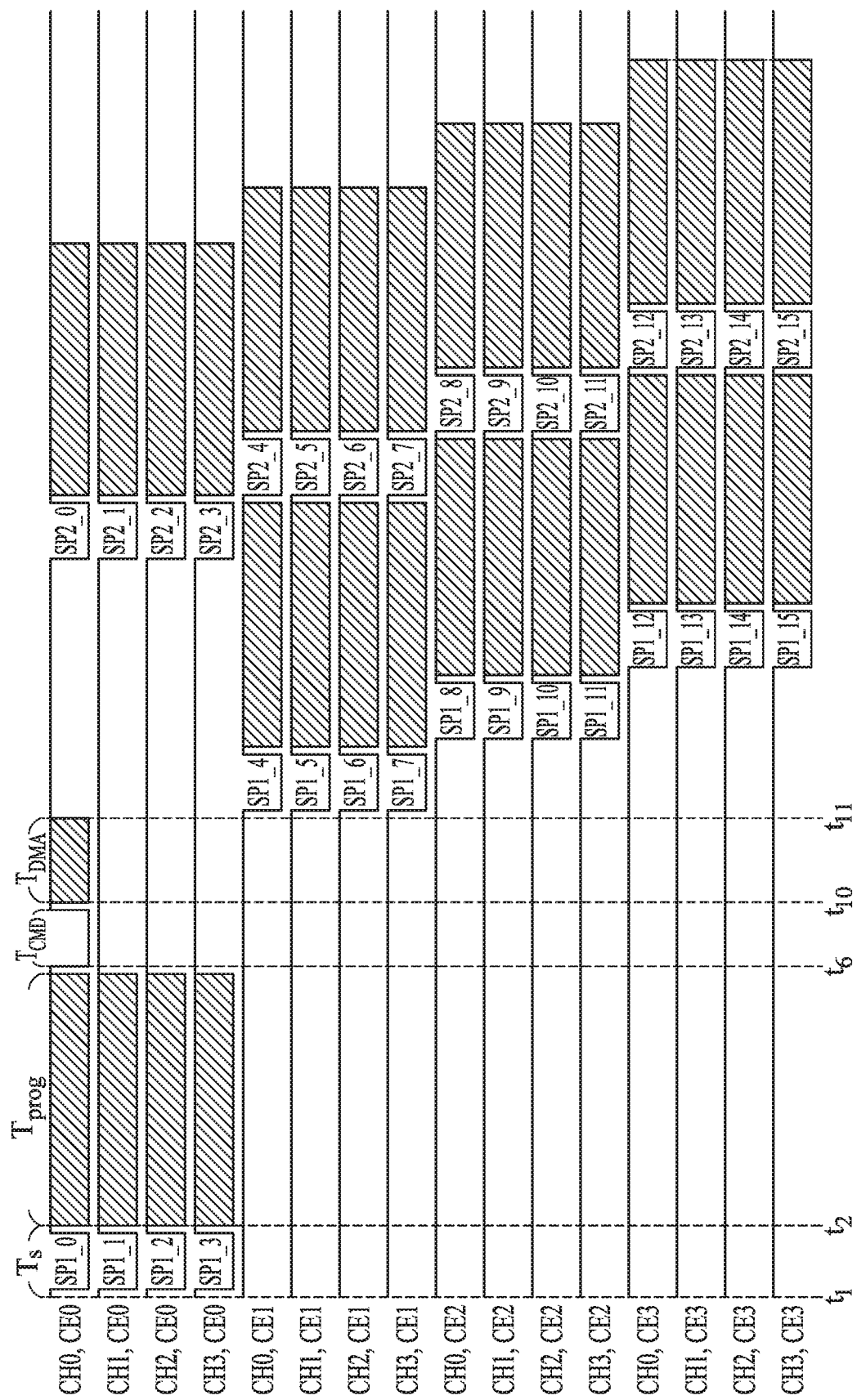

As described above, the updating operation of the group mapping tables 401 may have conflict with the writing operation of the super page data. In an embodiment, the memory controller 160 may perform the read command, such as the read command from the host 120 or generated by the memory controller 160, with a higher priority or using an interrupt signal. Alternatively, the memory controller 160 may also sequentially perform the commands in the command queue, and the command queue, for example, can be stored in a command buffer (not shown). FIGS. 5B and 5C are diagrams of the interleaving programming mechanism of the flash memory plus the read operation in accordance with an embodiment of the invention. As depicted in FIG. 5B, at time t2, the memory controller 160 performs a read command to read a group mapping table 401 from the LUN corresponding to the channel CH0, and the read command includes a command-loading phase (i.e., the loading time $T_{CMD}$) and a data-transmission phase (i.e., transmission time $T_{DMA}$). It should be noted that in order to perform the read command, the interleaving scheme of writing the super page data SPD1 is forced to interrupted, and it is necessary to wait until time t8 before the memory controller 160 can continue to enable the chip enable signals CE1, CE2, and CE3 to writing the remaining logical pages of data SPD1_4~SPD1_15 into the flash memory 180. This may cause the programming phase of the LUNs of the channels CH0~CH3 of the chip enable signals CE1, CE2, and CE3 cannot be sufficiently overlapped with the programming phase of the LUNs of the channels CH0~CH3 of the chip enable signal CE0, and the time required to completely writing the super page data SPD1 into the flash memory is also increased, resulting in decrement of the write performance (i.e., the amount of data written into the data storage device 140 per unit time decreases). In addition, this may also increase the complexity of data management and instruction execution.

Additionally, in the worst case, the group-mapping table 401 to be read by the memory controller 160 is located just in the corresponding LUN of the current chip enable signal CE. As shown in FIG. 5C, the memory controller 160 cannot complete the operations in the channels CH0~CH3 of the chip enable signal CE0 until time t11, and can continue the operations of the corresponding LUNs of the channels CH0~CH3 of the chip enable signals CE1~CE3. As can be seen from FIG. 5C, from time t1 to time t11, the memory controller 160 cannot perform any operation on the channels CH0~CH3 corresponding to the chip enable signals CE1~CE3, and the time required to fully write the super page data SPD1 to the flash memory 180 is significantly increased, resulting in severe degradation of the write performance of the data storage device 140. This situation of the worst case is easy to occur in the environment of random data writing, and this may cause severe degradation of the write performance of the data storage device 140 in the environment of random data writing.

Figure 5D:
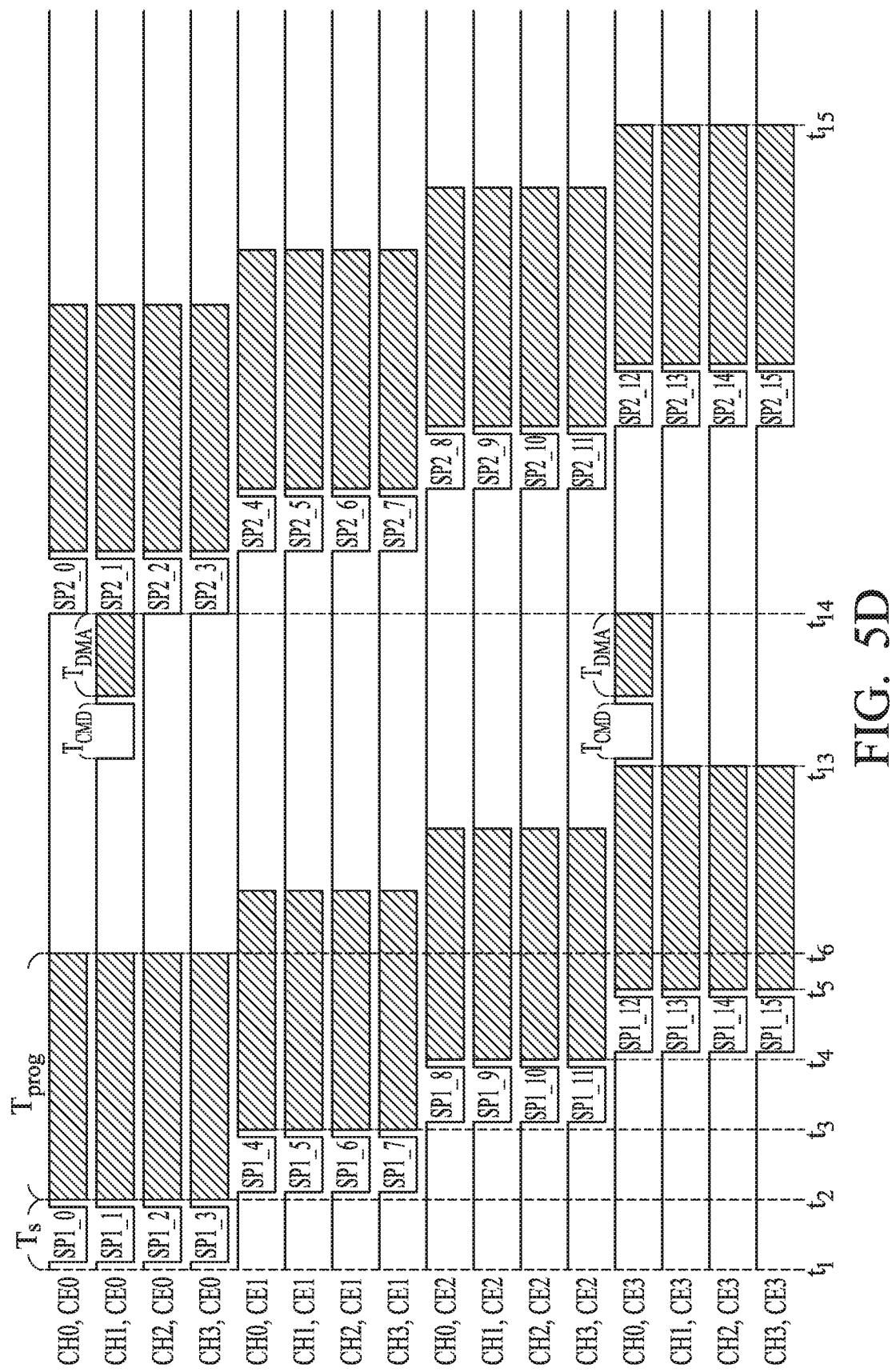

FIGS. 5D and 5E are diagrams of the interleaving programming mechanism of the flash memory plus the read operation in accordance with an embodiment of the invention.

In the present invention, the memory controller 160 may preferentially complete the execution of the write command (e.g., the current write command). After the current write command is completed, it is determined whether there is a read command in the command queue. If there is a read command in the command queue, the command queue is performed. For example, the memory controller 160 may receive two access commands from the host 120, where each access command may write 64 logical sectors of data into the flash memory 180. After that, the memory controller 160 receives a read command to read the data associated with the logical address LBA#1000. Assuming that the memory controller 160 has begun executing the first write command, the memory controller 160 continues to execute the first write command. After the execution of the first write command is completed, the memory controller 160 determines whether to execute the read command in the command queue. Since there is a first read command in the command queue, the memory controller 160 then executes the first read command to read the data associated with the logical address LBA#1000. In addition, due to the execution of the first write command, the memory controller 160 determines whether the one or more group-mapping tables 401 corresponding to the first write command have temporarily stored in the DRAM 190. For the group mapping tables 401 that have not been temporarily stored in the DRAM 190, the memory controller 160 generates a second read command to read the group-mapping tables 401. Upon execution of the first write command, the memory controller 160 may simultaneously, subsequently, of thereafter execute the second read command to read the group-mapping tables 401 corresponding to the first write command. After the group-mapping tables 401 are obtained, the memory controller 160 updates the content of the group-mapping tables 401 according to the physical address of each sector data in the first write command.

Afterwards, the memory controller 160 may execute the second write command to write 64 logical sectors of data into the flash memory 180. Similarly, the memory controller 160 may generate a third read command to obtain one or more group-mapping tables 401, which have not been temporarily stored in the DRAM 190, corresponding to the second write command. If the second read command is still in the command queue, the memory controller 160 may execute the second read command. Subsequently, the memory controller 160 may execute the third read command to obtain the one or more group-mapping tables 401 corresponding to the second write command, and update the content of the group-mapping tables 401 according to the physical address of each sector data in the second write command. After updating the group-mapping tables 401, the memory controller 160 may generate and execute a third write command to write the updated group-mapping tables to the flash memory 180. If there are still some of the group-mapping tables 401 that have not been written to the flash memory 180, the memory controller 160 may generate and execute a fourth write command to write the remaining updated group-mapping tables 401 to the flash memory 180.

In addition, the memory controller 160 may preferably record the update statuses of the group-mapping tables 401 temporarily stored in the DRAM 190. For example, the memory controller 160 may wait for the number of updated group-mapping tables 401 stored in the DRAM 190 is greater than a predetermined number, such as 16, and then generate and execute the third write command.

For example, as depicted in FIG. 5D, at time t13, the memory controller 160 has completed execution of the first write command, and the programming phase of the LUNs corresponding to each of the chip enable signals CE0~CE3 is completed. Assuming that the group-mapping table corresponding to the logical address LBA#1000 has been stored in the DRAM 190, the memory controller 160 may query the group-mapping table 401 corresponding to the logical address LBA#1000 to know that the data corresponding to the logical address LBA#1000 is stored in the LUN in the channel CH0 corresponding to the chip enable signal CE3. The memory controller 160 may then enable the chip enable signal CE3 to read the data corresponding to the logical address LBA#1000 from the LUN in the channel CH0. In addition, the second read command is to read one of the group-mapping tables 401 from the LUN in the channel CH1 corresponding to the chip enable signal CE0, and the memory controller 160 may simultaneously enable the chip enable signal CE0 to obtain the group-mapping table 401 from the LUN in the channel CH1, and stores the obtained group-mapping table 401 in the second predetermined space 430 of the DRAM 190. After storing the obtained group-mapping table 401 in the DRAM 190, the memory controller 160 may update the content of the obtained group-mapping table 401. At time t14, the first read command and the second read command have been completed. Assuming that there is no read command in the command queue, the memory controller 160 may start to execute the second write command. For example, the memory controller 160 may write the 64 logical sectors of data in the second write command into the LUNs in the channels CH0~CH3 corresponding to the chip enable signals CE0~CE3 using the interleaving mechanism as described in the aforementioned embodiment.

It should be noted that the first predetermined space 420 in the DRAM 190 preferably stores the group-mapping tables 401 required for execution of the read command, and the second predetermined space 430 in the DRAM 190 preferably stores the group-mapping tables 401 required for execution of the write command. In addition, the memory controller 160 may respectively calculate the number of group-mapping tables 401 in the first predetermined space 420 and that in the second predetermined space 430, and dynamically adjust the size of the first predetermined space 420 or the second predetermined space 430 according to the calculated numbers of the group-mapping tables 401.

Afterwards, at time t15, the write operation of the super page data SPD2 is completed, and the memory controller 160 may also complete updating the group-mapping tables 401. At this time, the memory controller 160 may directly write the updated group-mapping tables 401 to the flash memory 180, or alternatively, the memory controller 160 write the updated group-mapping tables 401 to the flash memory when a predetermined condition is satisfied. For example, the number of updated group-mapping tables 401 is greater than or equal to 64. Thus, the memory controller 160 may form super page data SPD using the 64 updated group-mapping tables 401, and then write the super page data SPD to the flash memory 180.

In addition, the memory controller 160 does not need to wait for the super page data SPD1 being fully written into the flash memory 180 to execute other read commands. As long as the LUNs have entered the ready state from the busy state, the memory controller 160 can perform operations on the LUNs. For example, when the LUNS in the channels CH0~CH3 corresponding to the last chip enable signal (e.g., CE3) have entered the programming phase, after the programming phase of the LUNs in the channels CH0~CH3 corresponding to the chip enable signal CE0 has completed, the memory controller 160 may read the group-mapping table 401 in the channels CH0~CH3 corresponding to the chip enable signal CE0, as depicted in FIG. 5E. Alternatively or additionally, if there is no read command in the command queue, the memory controller 160 may start the write operation of the super page data SPD2.

Compared with FIGS. 5B and 5C, in the embodiments of FIGS. 5D and 5E, the execution of the read command does not affect the writing of the super page data SPD, so that the data storage device 140 can write a greater amount of data to the flash memory 180 in a unit of time, thereby achieving better write performance of the data storage device 140.

Figure 6:
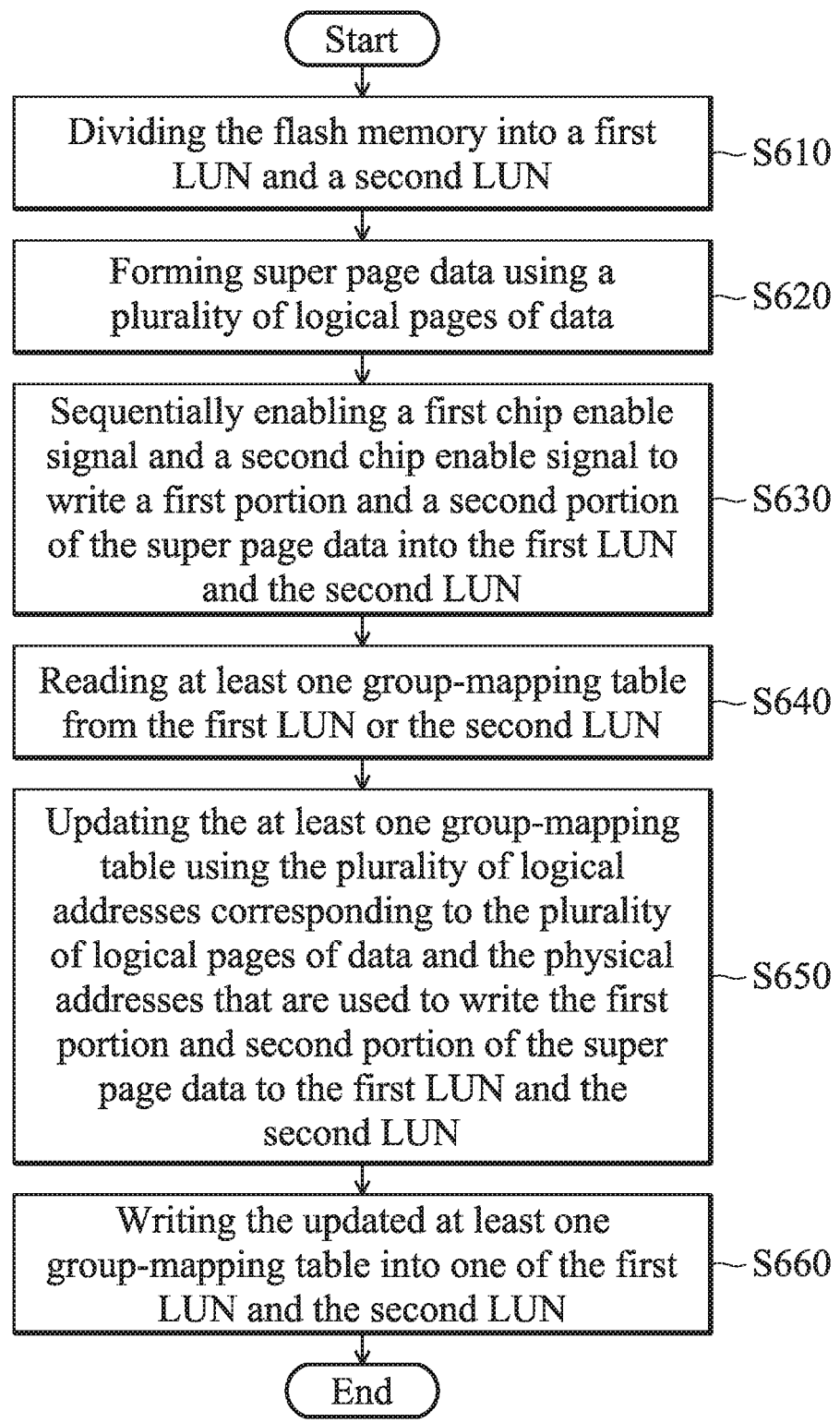
FIG. 6 is a flow chart of a method for updating the logical-to-physical mapping table in accordance with an embodiment of the invention.

FIG. 6 is a flow chart of a method for updating the logical-to-physical mapping table in accordance with an embodiment of the invention.

Referring to FIG. 1 and FIG. 6, in step S610, the memory controller 160 may divide the flash memory 180 into a first LUN and a second LUN, wherein the first LUN and the second LUN are respectively controlled by a first chip enable signal and a second chip enable signal.

In step S620, the memory controller 160 forms super page data SPD using a plurality of logical pages of data. For example, the memory control 160 may receive a write command from the host 120, and form the super page data SPD using the logical pages (or logical sectors) of data using in the write command.

In step S630, the memory controller 160 sequentially enables a first chip enable signal and a second chip enable signal to write a first portion and a second portion of the super page data SPD into the first LUN and the second LUN. For example, the memory controller 160 may use the interleaving mechanism to write the first portion and the second portion of the super page data SPD into the first LUN and the second LUN, where the timing diagram of the interleaving mechanism can be referred to FIGS. 5D and 5E.

In step S640, the memory controller 160 reads at least one group-mapping table from the first LUN or the second LUN. For example, the at least one group-mapping table read by the memory controller 160 may be a group-mapping table corresponding to the logical addresses in a read command from the host 120 or a group-mapping table, that has not been stored in the DRAM 190, corresponding to the logical address in a write command from the host. In an embodiment, if the group-mapping table to be used by the memory controller 160 has not been stored in the DRAM 190, the memory controller 160 may add the read command for accessing the to-be-used group-mapping table from the flash memory 180 into the command queue. In addition, the memory controller 160 may preferentially complete the execution of the write command (e.g., the current write command). After the execution of the current write command is completed, the memory controller 160 may determine whether there is a read command in the command queue. If there is a read command in the command queue, the memory controller 160 executes the read command.

In step S650, the memory controller 160 may update the at least one group-mapping table using the plurality of logical addresses corresponding to the plurality of logical pages of data and the physical addresses that are used to write the first portion and second portion of the super page data to the first LUN and the second LUN. After then super page data has been written into the first LUN and the second LUN, the mapping relationships between logical addresses and physical address in each logical page of the super page data are changed. Accordingly, the memory controller 160 may update the at least one group-mapping table using the plurality of logical addresses corresponding to the plurality of logical pages of data and the physical addresses that are used to write the first portion and second portion of the super page data to the first LUN and the second LUN.

In step S660, the memory controller 160 writes the updated at least one group-mapping table into one of the first LUN and the second LUN. Since the at least one group-mapping table updated by the memory controller 160 is a portion of the L2P table in the flash translation layer (FTL) 181, the memory controller 160 may write the updated at least one group-mapping table in an appropriate time (e.g., a predetermined condition is satisfied) into one of the first LUN and the second LUN. The predetermined condition, for example, may be the number of the updated group-mapping tables in the DRAM 190 has reached a predetermined number, such as the number of logical pages in a logical super page, but the invention is not limited thereto.

In view of the above, a data storage device and a method of updating the logical-to-physical mapping table thereof are provided in the present application. The data storage device and the method are capable of providing an updating mechanism during execution of the write command in the condition that the size of the DRAM of the memory controller in the data storage device is not sufficient to store the whole logical-to-physical mapping table, so that the memory controller needs not to interrupt the interleaving mechanism of the write operation between the LUNs corresponding to different chip enable signals while the memory controller is executing the write command of a super page. In addition, the memory controller may read the group-mapping tables required by the write command from the flash memory to the DRAM in a predetermined time, update the group-mapping tables write the updated group-mapping tables back to the flash memory in an appropriate time, thereby improving the write performance of the data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory, configured to store a logical-to-physical mapping (L2P) table, wherein the L2P table is divided into a plurality of group-mapping tables, and the flash memory comprises a first logical unit number (LUN) and a second LUN that are respectively controlled by a first chip enable signal and a second chip enable signal;
   a dynamic random access memory (DRAM), configured to store a first set of the group-mapping tables; and
   a memory controller, configured to receive a write command from a host, and form super page data using a plurality of logical pages of data in the write command;
   wherein the memory controller is further configured to sequentially enable the first chip enable signal and the second chip enable signal to write a first portion and a second portion of the super page data to the first LUN and the second LUN,
   wherein in response to the super page data having been written into the first LUN and the second LUN, the memory controller reads at least one of the group-mapping tables from the first LUN or the second LUN to the DRAM.

2. The data storage device as claimed in claim 1, wherein:
   when the first chip enable signal is enabled to write the first portion of the super page data in the first LUN and a first read command corresponding to the at least one group-mapping table has been stored in a command queue, second portion of the super page data to the second LUN after the first LUN has entered a programming phase; and
   in response to the super page data having been written into the first LUN and the second LUN, the memory controller executes the first read command to read the at least one group-mapping table from the first LUN or the second LUN to the DRAM.

3. The data storage device as claimed in claim 2, wherein when the first chip enable signal is enabled to write the first portion of the super page data into the first LUN and the first read command corresponding to the at least one group-mapping has been stored in the command queue:
   in response to the at least one group-mapping table being in the first LUN, the memory controller executes the first read command to read the at least one group-mapping table from the first LUN to the DRAM after the programming phase of the first LUN has finished; and
   in response to the at least one group-mapping table being in the second LUN, the memory controller executes the first read command to read the at least one group-mapping table from the second LUN to the DRAM after the programming phases of the first LUN and the second LUN have finished.

4. The data storage device as claimed in claim 3, wherein:
   after the memory controller has executed the first read command to read at least one group-mapping table from the first LUN or the second LUN to the DRAM, the memory controller is further configured to update the at least one group-mapping table according to a plurality of logical addresses corresponding to the logical pages of data of the write command and a plurality of physical addresses that are used to write the logical pages of data into the first LUN and the second LUN.

5. The data storage device as claimed in claim 4, wherein:
   after the memory controller has updated the at least one group-mapping table, in response to a predetermined condition being satisfied, the memory controller writes the updated group-mapping tables stored in the DRAM in the flash memory.

6. The data storage device as claimed in claim 5, wherein the predetermined condition indicates that a number of the updated group-mapping tables in the DRAM has reached a predetermined number.

7. A method for updating a logical-to-physical mapping (L2P) table, for use in a data storage device, wherein the data storage device comprises a flash memory and a dynamic random access memory (DRAM), wherein the flash memory is configured to store the L2P table, and the L2P table is divided into a plurality of group-mapping tables, and the flash memory comprises a first logical unit number (LUN) and a second LUN that are respectively controlled by a first chip enable signal and a second chip enable signal, the method comprising:
   forming super page data using a plurality of logical pages of data of a write command from a host;

sequentially enabling the first chip enable signal and the second chip enable signal to write a first portion and a second portion of the super page data to the first LUN and the second LUN; and in response to the super page data having been written into the first LUN and the second LUN, reading at least one of the group-mapping tables from the first LUN or the second LUN to the DRAM.

8. The method as claimed in claim 7, wherein the step of reading the at least one group-mapping table from the first LUN or the second LUN to the DRAM comprises:

when the first chip enable signal is enabled to write the first portion of the super page data in the first LUN and a first read command corresponding to the at least one group-mapping table has been stored in a command queue, enabling the second chip enable signal to write the second portion of the super page data to the second LUN after the first LUN has entered a programming phase; and in response to the super page data having been written into the first LUN and the second LUN, executing the first read command to read the at least one group-mapping table from the first LUN or the second LUN to the DRAM.

9. The method as claimed in claim 8, wherein the step of reading the at least one group-mapping table from the first LUN or the second LUN to the DRAM comprises:

when the first chip enable signal is enabled to write the first portion of the super page data into the first LUN and the first read command corresponding to the at least one group-mapping has been stored in the command queue:

in response to the at least one group-mapping table being in the first LUN, executing the first read command to read the at least one group-mapping table from the first LUN to the DRAM after the programming phase of the first LUN has finished; and in response to the at least one group-mapping table being in the second LUN, executing the first read command to read the at least one group-mapping table from the second LUN to the DRAM after the programming phases of the first LUN and the second LUN have finished.

10. The method as claimed in claim 9, wherein after executing the first read command to read the at least one group-mapping table from the first LUN or the second LUN to the DRAM, the method further comprises:

updating the at least one group-mapping table according to a plurality of logical addresses corresponding to the logical pages of data of the write command and a plurality of physical addresses that are used to write the logical pages of data into the first LUN and the second LUN.

11. The method as claimed in claim 10, wherein after updating the at least one group-mapping table, the method further comprises:

in response to a predetermined condition being satisfied, writing the updated group-mapping tables stored in the DRAM in the flash memory.

12. The method as claimed in claim 11, wherein the predetermined condition indicates that a number of the updated group-mapping tables in the DRAM has reached a predetermined number.

\* \* \* \* \*